United States Patent [19]

Buickerood et al.

[11] Patent Number: 4,733,905

[45] Date of Patent: Mar. 29, 1988

[54] COMBINATION CHAIR AND CART

[75] Inventors: Kenneth N. Buickerood, Redwood City, Calif.; Edgar J. Garroni, 3713 Encline Way, Belmont, Calif. 94002

[73] Assignee: Edgar J. Garroni, Belmont, Calif.

[21] Appl. No.: 40,412

[22] Filed: Apr. 20, 1987

[51] Int. Cl.⁴ .............................................. A47C 13/00
[52] U.S. Cl. ................................ 297/129; 280/47.25; 280/655; 297/118
[58] Field of Search ..................... 297/118, 129, 217; 280/47.25, 654, 655, 648, 658

[56] References Cited

U.S. PATENT DOCUMENTS

| | | | |
|---|---|---|---|
| 3,073,614 | 1/1963 | Zinneman | 297/129 X |
| 3,388,919 | 6/1968 | Waag | 280/654 |
| 3,997,213 | 12/1976 | Smith et al. | 297/129 X |
| 4,523,773 | 6/1985 | Holtz | 280/655 X |
| 4,523,774 | 6/1985 | Dickerson | 280/655 |

*Primary Examiner*—Kenneth J. Dorner
*Assistant Examiner*—Peter R. Brown
*Attorney, Agent, or Firm*—Townsend and Townsend

[57] ABSTRACT

A two-wheeled vehicle which can be collapsed into a fully compact, retracted condition or expanded into any one of a number of different forms including the form of a cart, a chair or seat and a two-wheeled carrier for an elongated object, such as a two-wheeled carrier for an elongated object, such as a surfboard. The vehicle has an axle provided with a pair of wheels at the opposed ends thereof. First and second U-shaped elements are pivotally connected to the shaft near respective wheels. A flexible sheet is mounted on and extends between the crosspieces of the first and second elements. Third and fourth U-shaped elements are pivotally coupled intermediate their ends on respective first and second elements, and the positions of these third and fourth elements determine the form in which the unit is to assume. A locking bar near each mounting plate frictionally engages the fourth element to releasably lock the latter in its operative position so that the fourth element forms the handle of a cart. Adjustments of the third and fourth elements from the cart locations thereof permits the unit of the present invention to be converted from the cart to a chair and from the chair to a two-wheeled carrier.

11 Claims, 5 Drawing Figures

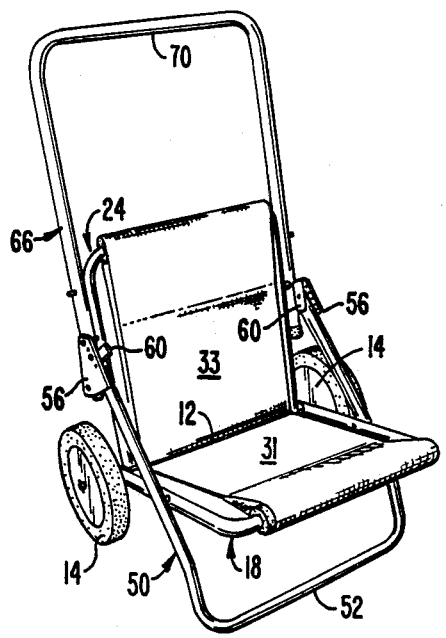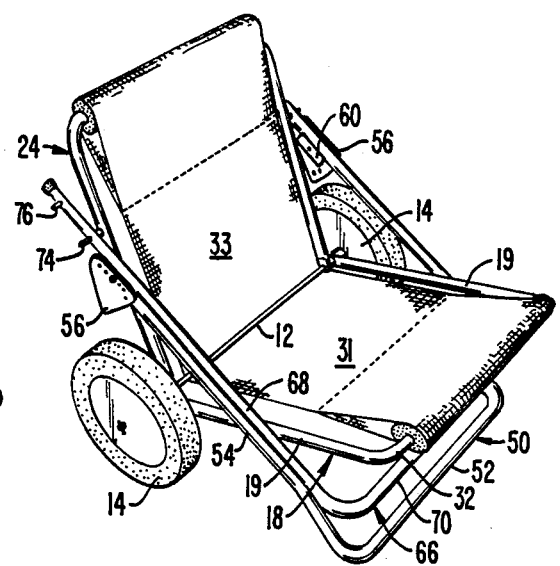
FIG._1.  FIG._2.
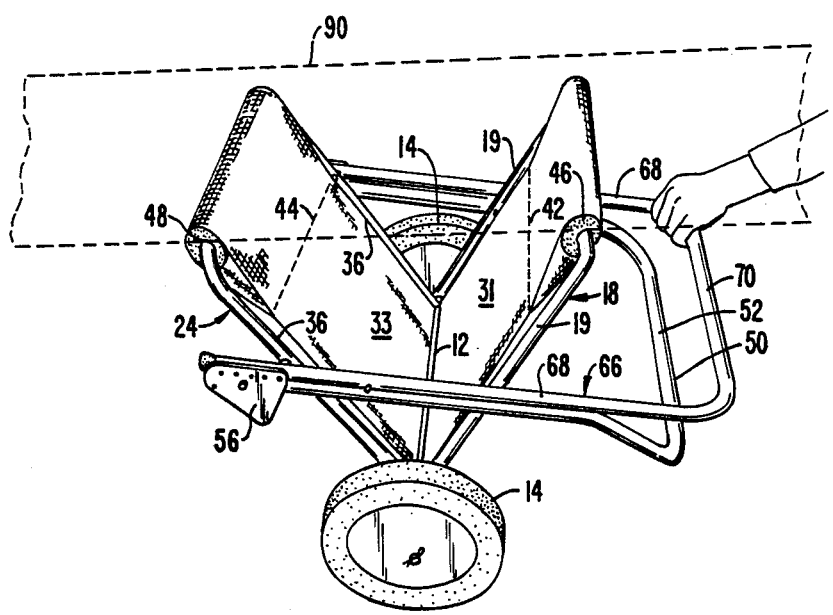
FIG._3.

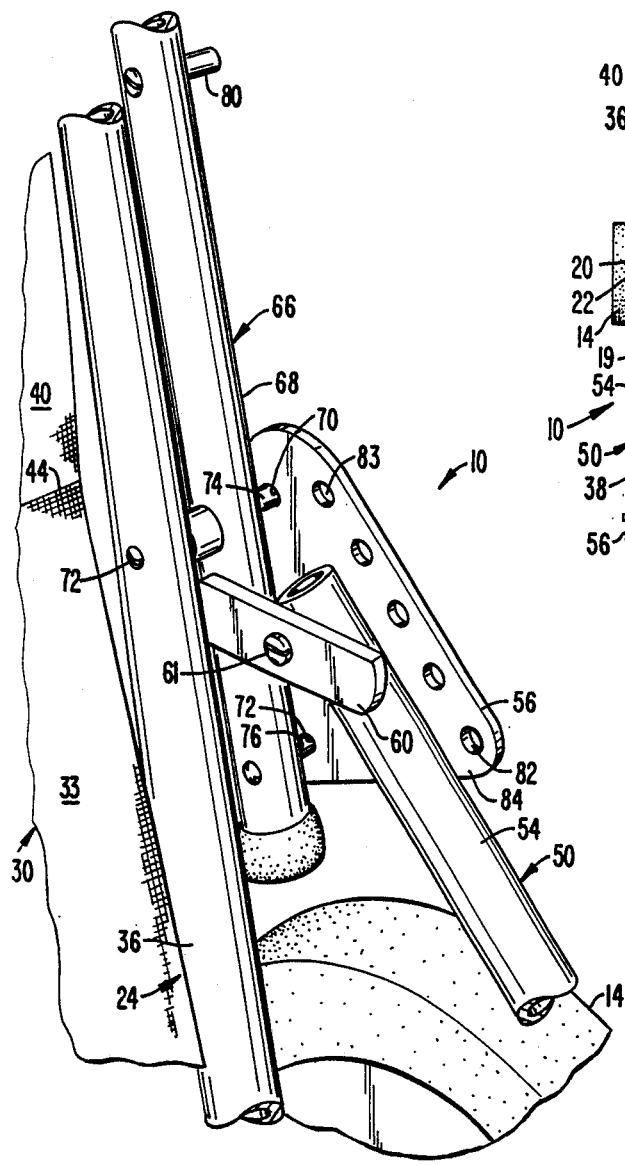
FIG._4.
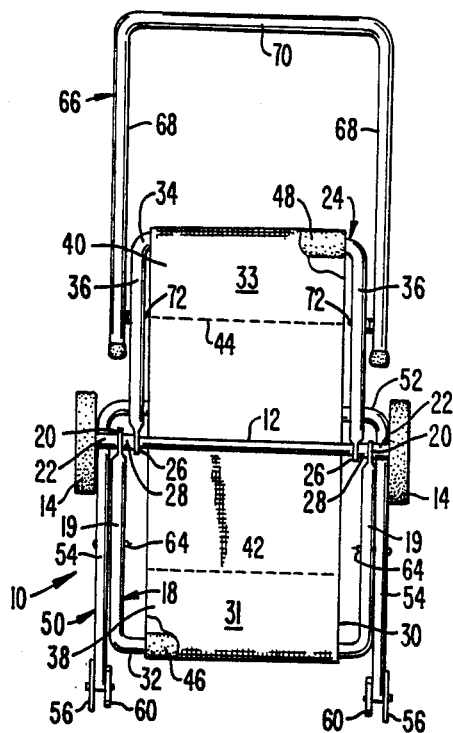
FIG._5.

COMBINATION CHAIR AND CART

This invention relates to improvements in two-wheeled carts and, more particularly, to a cart which can be converted into a chair and into a two-wheeled carrier.

BACKGROUND OF THE INVENTION

Two-wheeled carts have been known and used extensively in the past. Such carts have a handle which can be hand held at about chest level and be provided with a seat like platform and a back for holding cartons, boxes and other objects to be moved from place to place. For the most part, these carts serve only a single purpose and cannot be converted into any other purpose, such as use as a chair or seat or use as a two-wheeled support for an elongated member, such as a surfboard, ladder or the like. Because of these drawbacks with carts of convention design, a need exists for an improved cart which can be converted into several other forms, including the form of a chair or seat and a two-wheeled carrier for supporting an elongated object. The present invention satisfies this need.

SUMMARY OF THE INVENTION

The present invention is directed to a two-wheeled unit or vehicle which can be collapsed into a fully compact, retracted condition or it can be expanded into any one of a number of different forms including the form of a cart, a chair or seat and a two-wheeled carrier for an elongated object, such as a surfboard. To this end, the unit of the present invention has an axle member or shaft provided with a pair of wheels at the opposed ends thereof. First and second U-shaped elements are pivotally connected at the ends thereof to the shaft near respective wheels. A flexible sheet, such as nylon mesh or canvas material, is mounted on and extends between the crosspieces of the first and second elements as they extend outwardly from the shaft.

Third and forth U-shaped elements are pivotally coupled intermediate their ends on respective first and second elements, and it is the manipulation of these third and fourth elements which determine the form in which the unit is to assume. For instance, if the unit is to be in the form of a cart, the fourth element is pivoted so that it extends upwardly and rearwardly from the second element and is coupled to the third element, such as by pins carried by the fourth element and received within aligned holes in mounting plates at the side of the third element. A locking bar near each mounting plate frictionally engages the fourth element to releasably lock the latter in its operative position so that the fourth element forms the handle of the cart.

Adjustments of the third and fourth elements from the cart locations thereof permits the unit of the present invention to be converted from the cart to a chair or seat and from the chair or seat to a two-wheeled carrier. In all of the configurations, the mounting plates at the sides of the third element always mate with pins on the sides of the fourth element, and the locking bars lock the third and fourth elements together so that the unit, regardless of what form it is in, is stable, sturdy and rugged so as to be able to withstand rough handling.

The primary object of the present invention is to provide an improved utility unit which can be converted from a collapsed condition to a cart, from the cart to a chair and from the chair to a two-wheeled carrier for elongated objects so that the unit is suitable for a number of different uses on different occasions and the unit is simple and rugged in construction notwithstanding its versatility.

Other objects of this invention will become apparent as the following specification progresses, reference being had to the accompanying drawings for an illustration of the invention.

IN THE DRAWINGS

FIG. 1 is a perspective view of the combination chair and cart unit of the present invention, the parts of the unit being in positions to form a cart;

FIG. 2 is a view similar to FIG. 1 but showing the unit in the form of a chair;

FIG. 3 is a view similar to FIGS. 1 and 2 but showing the unit adapted to carry and support an elongated member, such as a surfboard;

FIG. 4 is an enlarged, fragmentary, perspective view of the unit, showing the connection means for the cart of FIG. 1; and FIG. 5 is a plan view of the unit in a collapsed condition.

The combination chair and cart unit of the present invention is broadly denoted by the numeral 10 and includes an elongated axle member 12 or shaft having a pair of ground-engaging wheels mounted on the opposite ends of the shaft. Preferably, the wheels are removably mounted on the shaft by cotter pins to assist in assembling the parts of unit 10.

A first U-shaped element 18 is pivotally mounted at the ends 20 thereof on shaft 12 near the opposite ends of the shaft. First element 18 has a pair of parallel sides 19. Each end 20 has a hole therethrough for rotatably receiving the shaft 12, whereby first element 18 can pivot about the axis of shaft 12 into several operative positions as hereinafter described. A pair of tubular spacers 22 (FIG. 5) space the ends 20 of first element 18 from wheels 14.

First element 18 can be of any suitable construction; however, for purposes of illustration, it is formed of steel tubing which is light in weight but sufficiently strong to carry out the purposes of unit 10 when the latter is in use as hereinafter described. The ends 20 of element 18 are flattened so that they will have sufficient strength and so that holes can be formed in ends 20.

A second U-shaped element 24 is pivotally mounted at ends 26 thereof on shaft 12 inboard of respective ends 20 of first element 18. Ends 26 have holes like ends 20 for pivotally receiving shaft 12, and a pair of spacers 28 are mounted on shaft 12 for spacing ends 20 and 26 from each other while allowing first and second U-shaped elements 18 and 24 to pivot relative to each other and relative to shaft 12. Second element 24 has a pair of parallel sides 36, and ends 26 are on the outer extremities of sides 36.

A flexible, rectangular sheet 30 is secured at the ends thereof on the crosspieces 32 and 34 of respective first and second elements 18 and 24. The width of sheet 30 is slightly less than the distance between the parallel sides 36 of second element 24 as shown in FIG. 5. To couple the sheet to crosspieces 32 and 34, the sheet 30 is provided with end loops 38 and 40 which are formed by doubling the sheet back upon itself and stitching the sheet along lines 42 and 44, respectively, as shown in FIG. 5. Rolls 46 and 48 of padding material surround members 32 and 34 to soften the ends of the sheet 30. The sheet can be of any suitable material, such as a nylon mesh material or a canvas material, the only criterion being that it be flexible and possibly washable as well as brightly colored if desired.

A third U-shaped element 50 is provided adjacent to first element 18 as shown in FIG. 5. Element 50 has a crosspiece 52 and a pair of spaced parallel sides 54, the outer ends of sides 54 being provided with triangularly shaped mounting plates 56 and pivotal lock bars 60 thereon. Screws (not shown) are used to rigidly secure the plates 56 to the outer portions of sides 54. A screw 61 (FIG. 4) rotatably mounts each bar 60 on the inner portion of a respective side 54.

Sides 54 of element 50 are pivotally coupled intermediate their ends to sides 19 of first element 18 by screws 64, the screws 64 being intermediate the ends of sides 19 of element 18.

A fourth U-shaped element 66 having parallel, spaced sides 68 and a crosspiece 70 is pivotally secured at the sides thereof by screws 72 to the sides 36 of second element 24. The fourth element 66 is pivotal relative to second element 24 and also to first and third elements 50. Screws 72 are intermediate the ends of elements 24 and 86.

When properly assembled as shown in FIG. 5, unit 10 is constructed such that each of the four U-shaped elements is shiftable relative to each of the other elements.

In a storage condition of unit 10, fourth element 66 typically is pivoted through an arc of about 180° from its position shown in FIG. 1 so that crosspiece 70 thereof is in the vicinity of sides 19 and 54 of first and third elements 18 and 50. Essentially, therefore, all of the four U-shaped elements will be in planes which are almost parallel with each other so that the unit will be in a compact form for carrying purposes or storage in a minimum of space.

To convert the collapsed unit 10 into a cart of the type shown in FIG. 1, fourth element 66 is pivoted from its collapsed condition into its operative condition shown in FIG. 5 in which sides 68 of element 66 are generally parallel to and extend partially along arms 36 of element 24. Then, third element 50 is rotated relative to first element 18 in an arc of about 135° until crosspiece 52 of third element 50 is parallel to the ground below crosspiece 32 of first element 18 and until plates 56 and bars 60 are adjacent to the ends of side 68 of fourth element 66 as shown in FIG. 4. Plates 56 are provided with a pair of spaced holes 70 and 72 along first edges thereof for receiving a pair of spaced pins 74 and 76 carried by the outer portions of sides 68 of fourth element 66. These pins 74 and 76 are releasably received within holes 70 and 72 and are held in such holes because sides 54 of third element 50 are substantially coplanar with respective sides 68 of fourth element 66. The resilience of sides 54 allows plates 56 to be pulled outwardly and onto pins 74 so that, when holes 70 and 72 line up with pins 74 and 76, the pins will enter the holes. The spacing between sides 54 of third element 50, therefore, provides the means by which the plates 56 are held onto pins 74 and 76.

As shown in FIG. 4, once the plates are connected to fourth element 66, bars 60 can be pivoted into the space between second and fourth elements 24 and 66. Each bar 60 will then frictionally engage the corresponding side 68 of fourth element 66 so that the plates 56 will be releasably locked on pins 74 and 76.

When plates 56 are properly coupled to sides 68 of fourth element 66, the unit 10 will be in the form of a cart with the front portion 31 of sheet 30 slightly inclined upwardly and forwardly and with the rear portion 33 of sheet 30 inclined upwardly and rearwardly. Packages, boxes and cartons can be placed on front portion 31 and supported by rear portion 33 while fourth element 66 serves as a handle. The unit as a cart can be tilted slightly rearwardly to lift crosspiece 52 of third element 50 off the ground, then the cart can be pushed forwardly with the wheels movable over the ground.

In converting from the cart form of unit 10 as shown in FIG. 1 to the chair form shown in FIG. 2, pins 74 and 76 are removed from holes 70 and 72 (FIG. 4). This allows fourth element 66 to be pivoted forwardly through an angle of about 180° until crosspiece 70 is below crosspiece 32 of first element 18 and above crosspiece 52 of third element 50 as shown in FIG. 2. When this occurs, a pair of pin 80 on sides 68 of fourth element 66 are adjacent to plates 56, and the plates have respective holes 82 near one corner 84. Holes 82 are adapted to removably receive pins 80 when fourth element 66 is in the position shown in FIG. 2. Pins 80 in holes 82 effectively lock the second and fourth elements 50 and 66 together with front portion 31 slightly inclined upwardly and forwardly and back portion 33 slightly inclined upwardly and rearwardly. The two wheels and the crosspiece 52 of third element 50 will be the only parts of unit 10 which engage the ground when the unit 10 is the form of a chair as shown in FIG. 2. When in such chair form, bars 60 will be again in position to releasably lock second and fourth elements 50 and 66 together in a manner similar to the way the bars 60 forms locks as shown in FIG. 4.

FIG. 3 illustrates unit 10 in the form of a two-wheeled support or a carrier for an elongated member, such as a surfboard 90. To change from the chair form of FIG. 2 to the carrier form of FIG. 3, pins 80 are removed from holes 82 of plates 56 and the plates are moved further along the sides 68 of forth element 66 toward the ends of the sides 68 until pins 74 and 76 are aligned with holes 82 and 83 (FIG. 4). When this occurs, front portion 31 pivots toward rear portion 33, closing the angular gap between the two portions until holes 82 and 83 receive pins 76 and 74, respectively. When this occurs, the carrier can be pivoted about wheels 14 until the crosspieces 32 and 34 are generally horizontally aligned, whereupon member 90 can be placed on the crosspieces and supported thereby and pulled over the ground in a two-wheeled fashion.

To collapse carrier FIG. 3, the pins 74 and 76 are removed from holes 83 and 82, respectively and the four U-shaped units are pivoted relative to each other so that they return to the essentially collapsed condition shown in FIG. 5.

We claim:

1. A combination chair and cart unit comprising: a shaft having ground engaging wheels mounted thereon at the ends thereof; first and second U-shaped elements each having a pair of generally rigid sides and a crosspiece interconnecting first ends of the sides, the second ends of the sides being rotatably mounted on the shaft; a flexible sheet secured at the ends thereof to and extending between the crosspieces of the first and second elements and passing partially about the shaft, said sheet having a pair of parts normally extending outwardly from said shaft and being in operative position angularly disposed relative to each other; third and fourth U-shaped elements, each of the third and forth elements including a pair of generally rigid sides and a crosspiece at first ends of the sides; means pivotally connecting the sides of the third element with respective sides of the first element; means pivotally connecting the sides of the fourth element with respective sides of the second element, said fourth element being movable from a first location extending upwardly and away from the second element to a second location extending downwardly and along the third element when the third element is in a position extending forwardly and downwardly from the first element; and means coupling the adjacent ends of the third element with the ends of the fourth element when said fourth element is in the first and second operative locations thereof.

2. The combination as set forth in claim 1, wherein, the sides of the third and fourth elements are generally parallel with each other when the fourth element is in said second location.

3. The combination as set forth in claim 1, wherein the coupling means includes a number of pins on one of said third and fourth elements, and a plate on the other of said third and fourth elements, the plate having holes for removably receiving the pins.

4. The combination as set forth in claim 3, wherein the pins and plates are near respective second ends of the third and fourth elements.

5. The combination as set forth in claim 1, wherein the crosspiece of the third element is in a ground engageable position when the third element is in said position extending forwardly and downwardly from the first element.

6. The combination as set forth in claim 1, wherein the ends of the third and fourth elements are adjacent to each other when the fourth element is in either of said locations.

7. The combination as set forth in claim 1, wherein said coupling means includes a plate for each side of the third element, respectively, each plate having a number of pin-reciving holes therethrough, and a plurality of spaced pins on each side of the fourth element, respectively, one pin being in a respective hole when the fourth element is in the first location, and a second pin being in another hole when the fourth element is in the second location.

8. The combination as set forth in claim 7, wherein each plate has a pair of side margins which converge toward each other, said one pin being received within a hole adjacent to one side margin of a respective plate and the second pin being received within a hole adjacent to the other side margin of the plate.

9. The combination as set forth in claim 7, wherein the plates are attached to the outer portions of respective sides of said third element near the outer ends of the third element.

10. The combination as set forth in claim 1, wherein the coupling means permits said first element and the second element to be moved toward each other to decrease the angular distance therebetween whereby the elements and wheels can define a wheeled carrier for elongated objects.

11. The combination as set forth in claim 1, wherein the elements are movable into juxtapositions with each other to present a collapsed condition for said elements.

* * * * *